US011350635B2

(12) United States Patent
Jiraschek et al.

(10) Patent No.: US 11,350,635 B2
(45) Date of Patent: Jun. 7, 2022

(54) COATING FOR FUNCTIONAL PARTS MADE OF METAL

(71) Applicant: Haas Food Equipment GMBH, Vienna (AT)

(72) Inventors: Stefan Jiraschek, Königsbrunn (AT); Georg Kalss, Vienna (AT); Selma Hansal, Markt Piesting (AT); Wolfgang Hansal, Markt Piesting (AT); Gabriela Sandulache, Berndorf (AT)

(73) Assignee: HAAS FOOD EQUIPMENT GMBH, Vienna (AT)

( * ) Notice: Subject to any disclaimer, the term of this patent is extended or adjusted under 35 U.S.C. 154(b) by 0 days.

(21) Appl. No.: 16/098,556

(22) PCT Filed: May 4, 2017

(86) PCT No.: PCT/EP2017/060622
§ 371 (c)(1),
(2) Date: Feb. 8, 2019

(87) PCT Pub. No.: WO2017/191240
PCT Pub. Date: Nov. 9, 2017

(65) Prior Publication Data
US 2019/0230939 A1 Aug. 1, 2019

(30) Foreign Application Priority Data
May 4, 2016 (EP) .................... 16168257

(51) Int. Cl.
*C25D 3/56* (2006.01)
*A21B 3/13* (2006.01)
(Continued)

(52) U.S. Cl.
CPC ............ *A21B 3/13* (2013.01); *A47J 37/10* (2013.01); *C22C 19/03* (2013.01);
(Continued)

(58) Field of Classification Search
CPC ... A21B 3/13; A47J 37/10; C25D 5/12; C25D 5/18; C25D 5/14; C25D 5/50; C25D 3/56; C25D 3/562; C23C 18/1653; C22C 19/03
See application file for complete search history.

(56) References Cited

U.S. PATENT DOCUMENTS 4,262,060 A    4/1981  Shikata et al.
5,614,003 A *  3/1997  Mallory, Jr. ............ C23C 18/36
                                                    106/1.22

FOREIGN PATENT DOCUMENTS

CN    102787329 A    11/2012
EP    0 632 140 A1   1/1995
(Continued)

OTHER PUBLICATIONS

"Wear properties of Ni—Mo Coatings produced by pulse electroforming", Huang et al., Surface Coatings Technology 258 (2014), pp. 639-645 (Huang) (Year: 2014).*
(Continued)

*Primary Examiner* — Daniel J. Schleis
*Assistant Examiner* — Kevin Ct Li
(74) *Attorney, Agent, or Firm* — Amster, Rothstein & Ebenstein LLP (57) ABSTRACT

The invention relates to a coating of metal surfaces of functional parts made of metal, preferably baking plates and a method for producing such a coating, wherein at least one coating (2) comprising an alloy is applied galvanically to the metal surface (6), wherein the coating comprises a surface layer (3) which consists of a galvanically applied alloy which contains nickel (Ni), phosphorus (P) and tin (Sn) as the main component, and wherein the surface layer (3) is an alloy layer obtained by pulsed deposition, preferably inverse pulsed deposition from a galvanic bath.

21 Claims, 5 Drawing Sheets

(51) Int. Cl.
*C25D 5/12* (2006.01)
*C25D 5/14* (2006.01)
*C25D 5/18* (2006.01)
*C25D 5/50* (2006.01)
*C23C 18/16* (2006.01)
*C22C 19/03* (2006.01)
*C25D 5/00* (2006.01)
*A47J 37/10* (2006.01)

(52) U.S. Cl.
CPC .......... *C23C 18/1653* (2013.01); *C25D 3/562* (2013.01); *C25D 5/14* (2013.01); *C25D 5/18* (2013.01); *C25D 5/50* (2013.01); *C25D 5/611* (2020.08); *C25D 5/623* (2020.08); *C25D 5/627* (2020.08)

(56) References Cited

FOREIGN PATENT DOCUMENTS

| | | | |
|---|---|---|---|
| EP | 0 632 140 A1 | | 4/1995 |
| JP | 63014888 | | 1/1988 |
| JP | 05263260 | | 10/1993 |
| JP | H05263260 A | | 10/1993 |
| JP | 07143840 | | 6/1995 |
| JP | 07143840 A | * | 6/1995 |
| JP | 08119645 | | 5/1996 |
| JP | 08119645 A | | 5/1996 |
| JP | H08119645 A | | 5/1996 |
| JP | 2011137195 | | 7/2011 |
| JP | 2011137195 A | | 7/2011 |
| JP | 2011137195 A | * | 7/2011 |
| RU | 2126776 C1 | | 2/1999 |

OTHER PUBLICATIONS

"Electroless Deposition of Ni—Sn—P and Ni—Sn—Cu—P Coatings", Georgieva et al., Journal of The Electrochemical Society, 152, (11) pp. CC783-C788, 2005 (Georgieva) (Year: 2005).*
T1: Wolfgang E. G. Hansal, Sudipta Roy; Pulse Plating: Including 25 Tables, Chapter 7; 2012; Leuze Verlag (ISBN 978-3-87480-265-9).
T2: P. Papavasilopoulou, A. Zoikis-Karathanasis, E.A. Pavlatou, N. Spyrellis; Effect of Plating Parameters on NiP—SiC Electrodeposition; 2008; Proceedings of the 7th International Conference Coatings in Manufacturing Engineering, pp. 417-426.
T3: Aleksandra Lelevic, Frank C. Walsh; Electrodeposition of NieP composite coatings: A review; 2019; Surface and Coatings Technology 378.
T4: Sankara Narayanan, T S N and Seshadri, S K; Electro- and electroless plated coatings for corrosion protection. In: Corrosion Science and Technology: Mechanism, Mitigation and Monitoring; 2008; Narosa Publishing House, New Delhi pp. 177-221 (ISBN 978-81-7319-910-3).
T5: Ashraf T. Al-Hinaia, Muna H.Al-Hinai, Joydeep Dutta; Application of Eh-pH diagram for room temperature precipitation of zinc stannate microcubes in an aqueous media; 2014; Materials Research Bulletin 49; pp. 645-650.
T6: Wolfgang E. G. Hansal, Sudipta Roy; Pulse Plating: Including 25 Tables, Chapter 5; 2012; Leuze Verlag.
T7 M.S. Chandrasekar, Malathy Pushpavanam, Pulse and pulse reverse plating—Conceptual, advantages and applications, 2008, Electrochimica Acta 53 (2008) 3313-3322.

* cited by examiner

COATING FOR FUNCTIONAL PARTS MADE OF METAL

The invention relates to the coating of metal surfaces of functional parts and in particular the coating of baking plates or metal items for the purpose of baking baked products. Particularly preferably the invention relates to a baking plate with a baking plate body and a coating arranged thereon. Furthermore the invention relates to a method for producing the coating.

Coatings of functional parts with hard coating material are now standard in many different areas of industry. In the case of baking plates, in particular coating with hard chrome has proved successful. The high hardness and temperature resistance as well as the chemically very resistant passivation of the surface yield a combination of properties which have made hard chrome the material of choice in many areas in which these surface properties are important. Examples for this are roller coatings in printing machines, coating of hydraulic pistons and piston rods, coatings of moulds in the plastic and rubber industry and the coating of functional components in the pharmaceutical and food industry. Similarly, the coating of baking plates and baking plate sections for industrial baking machines has also proved advantageous.

However, a galvanic bath which contains hexavalent chromium as active component is used in coating with hard chrome. This hexavalent chromium is an environmental toxin and highly carcinogenic. Consequently, the use of this carcinogenic substance for the manufacture of industrial products is very restricted. For this reason, methods and coatings are sought which do not require the use of chromium VI.

However, the use of trivalent chromium baths is also feasible for a decorative chrome coating. The thicker hard chrome coating required for functional parts cannot be deposited from chromium-III baths. Furthermore, it should be assumed that the use of the trivalent modification of chromium will also be banned shortly.

Simple nickel alloys such as nickel phosphorus are state of the art and can be deposited without an external current or galvanically. Compared to hard chromium coatings however these layers do not have a sufficient layer hardness. In addition, nowhere near the passivity of a hard chrome layer can be achieved with nickel phosphorus layers.

The literature also describes coatings with a nickel alloy having a content of cobalt and phosphorus. However, the content of cobalt which could be dissolved into the wafer sheets from the coating is questionable under the food regulations and is not permitted in some countries.

It is thus an object of the present invention to provide a coating for metal surfaces and in particular for baking plates or other metal surfaces which come into contact with dough at elevated temperature, which have the required properties and are safe in terms of food regulations and technology. Requirements for the new coating lie in the areas of mechanical wear resistance, corrosion resistance, thermal resistance, food licensing, low contamination behaviour and positive baking behaviour, work and environmental safety, reasonable costs, security of supply and similar.

The invention further has the object to provide a coating for functional parts made of metal and in particular for baking plates or metal items for the purpose of baking baked products in which the use of chromium, chromium compounds or other alloy components or electrolyte components which are questionable in terms of food technology and food regulations is avoided. It is furthermore an aim of the invention to provide a surface which is provided with low roughness and which is safe under the food regulations and largely pore-free. In addition, the surface hardness must be sufficiently high for use in baking machines in order to ensure a sufficiently long life during baking and intermediate cleaning steps. It must be possible to produce the baking plates on a large scale industrially, wherein costs should be low.

It is furthermore the object of the invention to provide a coating for functional parts made of metal and in particular for baking plates or metal items for the food industry, preferably for the purpose of baking baked products, wherein the transfer of coating components, in particular nickel into the food is substantially prevented. In particular, it is the object of the invention to provide a coating which meets the requirements and the provisions in the area of the food industry.

The invention also comprises coatings for functional parts made of metal, which can generally be used in food technology and in other technologies, where the advantages achievable according to the invention are desired.

The invention is primarily characterized by the features of the claims. Further advantageous features are obtained from the following description.

Optionally it is provided that the coating comprises a surface layer which consists of an alloy which contains nickel (Ni) and phosphorus (P) as the main component, and furthermore at least one metal from the group molybdenum (Mo) and tin (Sn).

According to a further feature, it is provided that the surface layer contains P in the range of 1 to 15 wt. % and Mo up to 10 wt. % and/or Sn up to 10 wt. % and the remainder to 100 wt. % nickel.

According to a further feature, it is provided that the alloy contains 0.05 to 10.0 wt. % Sn and/or 0.01 to 10.0 wt. % Mo and 1 to 15 wt. % phosphorus and nickel to 100 wt. % and that the surface layer is an alloy layer obtained by galvanic deposition, preferably pulsed deposition, particularly preferably inverse pulsed deposition from a galvanic bath.

According to a further feature, it is provided that the surface layer has a roughness, the Ra value of which is less than 5 µm, preferably less than 3 µm and particularly preferably less than 2 µm.

According to a further feature, it is provided that the layer thickness of the surface layer is at least 5 µm, preferably between 10 µm and 50 µm.

According to a further feature, it is provided that one or more underlayers are disposed between surface layer and metal surface.

According to a further feature, it is provided that the underlayers are nickel layers applied electrolytically or without external current.

According to a further feature, it is provided that the hardness gradient of the underlayers as far as the surface layer is configured to be ascending.

According to a further feature, it is provided that the underlayers are double-layer and a first underlayer nearest the metal surface consists of a semi-gloss nickel layer or copper and a second underlayer consists of a gloss nickel layer.

Baking plates according to the invention have the coating described, wherein the coated metal surface is the baking surface of a baking plate, in particular a baking plate for the industrial manufacture of crispy brittle wafer sheets, waffles and hollow wafers as well as baked products of all kinds. In this case it is provided that the baking surface is formed with a moulding forming the baking mould and engraving.

According to a further feature, it is provided that the coated baking plate is annealed at temperatures between 150° C. and 400° C.

According to a further feature, it is provided that the baking plate body of the baking plate consists of cast iron, steel or aluminium.

The invention is described hereinafter with reference to the coating of a baking surface of a baking plate, wherein the term baking plate is to be understood in the widest sense. The baking plates can be configured with smooth, flat surfaces as baking surface. Such baking surfaces can also be provided with an engraving or surface design to mould the desired baked product made of dough accordingly. The baking plate can however, as a functional part made of metal, also have a roller form or the form of a cone around which the dough to be baked is wound or in the case of the roller, pressed into the soft dough. In the broadest sense, baking plates can be understood as any metal object with a surface which comes in contact with baked products. All these baking plates or functional parts have in common that they must be abrasion-proof even when frequent cleaning steps are required. Furthermore, the baked products must be easy to release from the surface free from residue. The baking plates can also be multipart, wherein a plurality of baking plate parts are arranged in a carrier frame.

The metal body to be coated is also designated hereinafter as baking plate body. Usually the baking plate body consists of a solid plate made of steel or cast iron, possibly also made of aluminium or aluminium alloys and is formed to be so solid that during the baking process the necessary hear can be stored or released. In this case, the baking plate as a whole can be provided with a baking surface on one of the flat sides as is required for large wafer baking plates to produce crispy brittle wafer plates. However, the baking plate body can also have smaller delimited baking surfaces if, for example, a plurality of separate pieces of the baked product are to be produced on a baking plate as can be the case with waffles.

Figure 1:
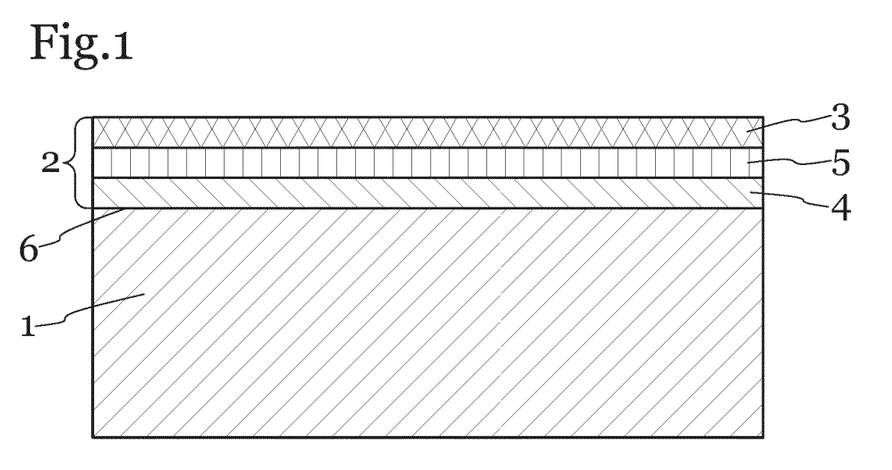
FIG. 1 shows a schematic cross-section through a functional part with coating.

The invention now is explained further for example with reference to FIG. 1 without wishing to thereby restrict the invention. The layer thicknesses are not shown to scale.

As shown in FIG. 1, the coating 2 according to the invention lies on the metal body (baking plate body 1). The coating 2 comprises either entirely or on its surface the galvanically applied alloy according to the invention which is hereinafter also called surface layer 3. Underlayers of various materials can also be applied under the surface layer 3, as is shown in the figure. Preferably a first underlayer 4 of, for example, semi-gloss nickel is deposited on the baking plate body 1 and then a gloss nickel layer is provided thereon. The surface layer 3 which exhibits the surface properties is then deposited on this gloss nickel layer 5.

The arrangement of one or more underlayers offers the advantage that the hardness gradient runs in an ascending manner from the material of the baking plate body 1 to the surface layer 3. This results in a substantially reduced tendency of the surface layer 3 to detach.

The underlayers can also be omitted if the surface layer according to the invention is deposited directly on the metal surface of the functional parts. It also lies within the scope of the invention to apply only one nickel underlayer. The nickel underlayers can be deposited both without an external current and also electrolytically, in a pulsed or non-pulsed manner. In the case of deposition without an external current, a phosphorus content can also be provided in the nickel underlayer. In one embodiment, a copper layer can be applied as a first underlayer 4, preferably up to 10 μm layer thickness, which is then followed by a nickel underlayer as carrier for the surface layer.

The surface layer with the alloy coating preferably has a layer thickness of at least 5 μm, preferably between 10 μm and 50 μm. A higher layer thickness can be provided in some cases but this brings with it the difficulty of the dimensional tolerance of the finished baking plate. A layer thickness of less than 5 μm is prone to wear and can only be used to a limited extent for functional parts made of metal. For example, a layer thickness of less than 5 μm can be advantageous for surfaces which are difficult to coat such as hollow wafer geometries if the mechanical loading is kept low. In this case, it should be noted that when coating an engraved surface, the deposition on the different surface patterns can vary. Thus, engraving tips are more thickly coated and the groove bases are less thickly coated. It is important that the ratio of the layer thicknesses does not vary too substantially.

The surface layer should have an arithmetic mean roughness Ra of less than 5 μm, preferably less than 3 μm and further preferably less than 2 μm. The Ra value is measured according to DIN EN 150 4288: 1998-04. The lower the roughness, the better the release property for the baked product and the lower the risk of contamination.

The surface coating used according to the invention and proving to be advantageous is a nickel phosphorus alloy which contains 1 to 15 wt. % of phosphorus and optionally 0.01 to 10 wt. % of molybdenum or 0.05 to 10 wt. % of tin or both tin and molybdenum within the given limits. The remainder to 100 wt. % is nickel.

Preferably two nickel layers are disposed between surface layer and baking plate body, namely a pulsed first nickel layer with a nickel matt layer and a pulsed gloss nickel layer thereon. The increasing hardness of the layers offers the advantage that the binding of the surface layer is increased and it is thus ensured that the surface layer cannot detach from the baking plate.

The surface designs provided on the baking plate body and in particular engraving can be configured according to the prior art and require no modification compared to this.

After the coating of the baking plate, it is advantageous to provide an annealing at temperatures between 150° C. and 400° C. For baking plates which during operation run continuously in a higher temperature range from about 180° C. to 220° C., the annealing can also be carried out during the ongoing operation so that a separate annealing step is not required.

The electrolyte for deposition of the surface coating preferably comprises a selection at least from the following salts and acids:

a) nickel sulphate hexahydrate in the range of 250-700 g/l
b) nickel chloride hexahydrate in the range of 5-50 g/l
c) tin (IV) chloride hydrate in the range of 1-40 g/l
d) tin (II) sulphate in the range of 1-30 g/l
e) tin (II) chloride dihydrate in the range of 1-40 g/l
f) odium molybdate dihydrate in the range of 1-30 g/l
g) molybdatophosphoric acid in the range of 1-30 g/l
h) sodium citrate in the range of 1-90 g/l
i) boric acid in the range of 25-45 g/l
j) phosphorous acid in the range of 1-25 g/l
k) phosphoric acid in the range of 1-5 g/l l) sodium hypophosphite in the range of 5-40 g/l
m) sodium gluconate in the range of 40-90 g/l
n) potassium sodium tartrate in the range of 10-50 g/l Further features of the method can be deduced from the claims.

According to the invention, it is provided that the metal surface is coated at least in sections with a surface layer of NiMoP or NiSnP or NiSnMoP alloy by galvanic deposition, preferably in a pulsed method and particularly preferably in an inverse pulsed method from a galvanic bath.

According to a further feature, it is provided that the pulsed deposition of the coating from an electrolyte bath is carried out with the following parameter ranges:
a unipolar pulse sequence with
pulse current density 0.5-15 A/dm$^2$
cathodic pulse time 5-100 ms
off time 0.5-25 ms According to a further feature, it is provided that a unipolar pulse sequence with base current and pulse pause as follows is used to produce the layer: pulse current density from 0.5 to 15 A/dm$^2$, base current density from 0.1 to 8 A/dm$^2$, cathodic pulse time from 5 to 100 ms, pulse pause from 0.5 to 30 ms, with a repetition rate of the cathodic sequence of 1 to 50 before the pulse pause.

According to a further feature, it is provided that a bipolar pulse with pulse pause as follows is used to produce the layer: cathodic pulse current density from 0.5 to 12 A/dm$^2$ with a pulse time from 5 to 100 ms, anodic pulse current density from 0.5 to 20 A/dm$^2$ with a pulse time from 5 to 100 ms, pulse pause from 0.5 to 30 ms, with a repetition rate of the cathodic sequence of 1 to 50 before the pulse pause.

According to a further feature, it is provided that a bipolar pulse with a base current as follows is used to produce the layer: cathodic pulse current density from 0.5 to 12 A/dm$^2$ with a pulse time from 5 to 100 ms, cathodic base current density from 0.5 to 12 A/dm$^2$ with a pulse time from 5 to 100 ms, anodic pulse current density from 0.5 to 20 A/dm$^2$ with a pulse time from 5 to 100 ms, with a repetition rate of the cathodic sequence of 1 to 50 before the anodic pulse current.

According to a further feature, it is provided that the electrolyte bath contains the following constituents:
nickel sulphate hexahydrate in the range of 250-700 g/l
nickel chloride hexahydrate in the range of 5-50 g/l
tin (IV) chloride hydrate in the range of 1-40 g/l
boric acid in the range of 25-45 g/l
phosphorous acid in the range of 1-25 g/l
phosphoric acid in the range of 1-5 g/l According to a further feature, it is provided that the electrolyte bath contains the following constituents:
nickel sulphate hexahydrate in the range of 250-700 g/l
nickel chloride hexahydrate in the range of 5-50 g/l
molybdatophosphoric acid in the range of 1-30 g/l
sodium citrate in the range of 1-90 g/l
boric acid in the range of 25-45 g/l
phosphorous acid in the range of 1-25 g/l
phosphoric acid in the range of 1-5 g/l According to a further feature, it is provided that the electrolyte bath contains the following constituents:
nickel sulphate hexahydrate in the range of 250-700 g/l
nickel chloride hexahydrate in the range of 5-50 g/l
sodium molybdate dihydrate in the range of 1-30 g/l
sodium citrate in the range of 1-90 g/l
boric acid in the range of 25-45 g/l
sodium hypophosphite in the range of 5-40 g/l
wherein the electrolyte bath additionally can contain the following constituents:
g) molybdatophosphoric acid in the range of 1-30 g/l
h) sodium citrate in the range of 1-90 g/l According to a further feature, it is provided that the electrolyte bath contains the following constituents:
nickel sulphate hexahydrate in the range of 250-700 g/l
nickel chloride hexahydrate in the range of 5-50 g/l
tin (II) sulphate in the range of 1-30 g/l
tin (II) chloride dihydrate in the range of 1-40 g/l
sodium molybdate dihydrate in the range of 1-30 g/l
boric acid in the range of 25-45 g/l
phosphorous acid in the range of 1-25 g/l
sodium gluconate in the range of 40-90 g/l
potassium sodium tartrate in the range of 10-50 g/l According to a further feature, it is provided that the electrolyte bath contains the following constituents:
nickel sulphate hexahydrate in the range of 250-700 g/l
nickel chloride hexahydrate in the range of 5-50 g/l
tin (II) sulphate in the range of 1-30 g/l
tin (II) chloride dihydrate in the range of 1-40 g/l
sodium molybdate dihydrate in the range of 1-30 g/l
boric acid in the range of 25-45 g/l
phosphorous acid in the range of 1-25 g/l
sodium gluconate in the range of 40-90 g/l
potassium sodium tartrate in the range of 10-50 g/l According to a further feature, it is provided that the pH is 1.0 to 5.0 and the bath temperature is 25° C. to 75° C.

The electrolyte has a pH of 1.0 to 5.5 and a temperature of 25 to 75° C.

In order to produce the alloy layer in one of these electrolytes, a direct current can be used, preferably with a current density of 0.5 to 15 A/dm$^2$.

In order to produce the layer, preferably a unipolar pulse sequence can be used as follows: pulse current density from 0.5 to 15 A/dm$^2$, cathodic pulse time from 5 to 100 ms, off time from 0 to 25 ms.

Furthermore, a unipolar pulse sequence with base current and pulse pause as follows can be used as follows to produce the layer: pulse current density from 0.5 to 15 A/dm$^2$, base current density from 0.1 to 8 A/dm$^2$, cathodic pulse time from 5 to 100 ms, pulse pause from 0.5 to 30 ms, with a repetition rate of the cathodic sequence of 1 to 50 before the pulse pause.

Furthermore a bipolar pulse with pulse pause can be used as follows to produce the layer: cathodic pulse current density from 0.5 to 20 A/dm$^2$ with a pulse time from 5 to 100 ms, anodic pulse current density from 0.5 to 20 A/dm$^2$ with a pulse time from 5 to 100 ms, pulse pause from 0 to 30 ms, with a repetition rate of the cathodic sequence of 1 to 50 before the pulse pause.

Furthermore a bipolar pulse with a base current can be used as follows to produce the layer: cathodic pulse current density from 0.5 to 20 A/dm$^2$ with a pulse time from 5 to 100 ms, cathodic base current density from 0.1 to 8 A/dm$^2$ with a pulse time from 5 to 100 ms, anodic pulse current density from 0.5 to 20 A/dm$^2$ with a pulse time from 5 to 100 ms, with a repetition rate of the cathodic sequence of 1 to 50 before the anodic pulse current.

The invention is explained in detail in the following examples without restricting the invention to the examples.

EXAMPLE 1: LAYER COMPRISING NICKEL, TIN AND PHOSPHORUS

The following electrolyte composition was proposed:
40 g/l boric acid
510 g/l nickel sulphate hexahydrate
20 g/l nickel chloride hexahydrate 21 g/l phosphorous acid 12 g/l tin (IV) chloride hydrate The chemicals are dissolved in order in warm water. After adding and dissolving all the components, the pH is adjusted. The pH is adjusted using 1% sodium hydroxide solution or 50% sulphuric acid.

The pH should lie between 1.1-1.8, the optimum is 1.2.

The electrolyte operates at a temperature of 55-75° C.

Deposition takes place whilst stirring vigorously (500 rpm).

A nickel-plated steel substrate was used as the substrate.

A unipolar rectangular pulse was used to produce the layer, wherein the mean current density was 4 A/dm$^2$. The cathodic current densities were 3.25 A/dm$^2$ for 15 ms and 6.5 A/dm$^2$ for 5 ms.

The coating time was 60 minutes.

The layers thus produced had the following composition: nickel 94.5 wt. %, tin 0.5 wt. %, phosphorus 5 wt. %, the alloy elements together gave 100%.

The layers showed good adhesion, were free from cracks and shiny, layer thicknesses were approximately 10 μm. Annealing at 200° C. was carried out for 30 minutes.

Figure 2:
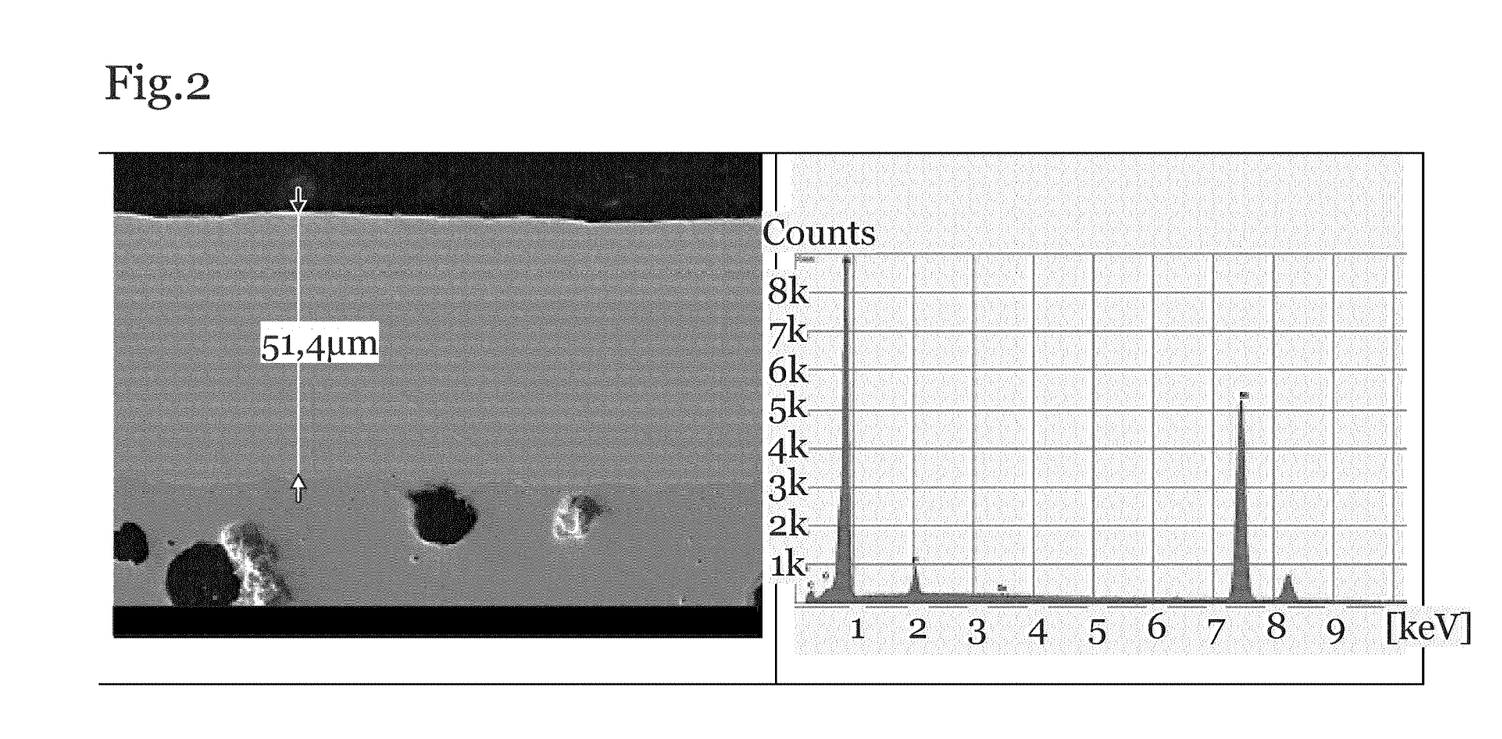
FIG. 2 to FIG. 5 show scanning electron microscope photographs of cross-sections of surfaces of the coatings according to the examples.

FIG. 2 shows a polished cross-section of the layer in a scanning electron microscope photograph and the EDX spectrum. The substrate was cast iron with spherical graphite. The coating had a thickness of 51.4 μm.

Figure 3:
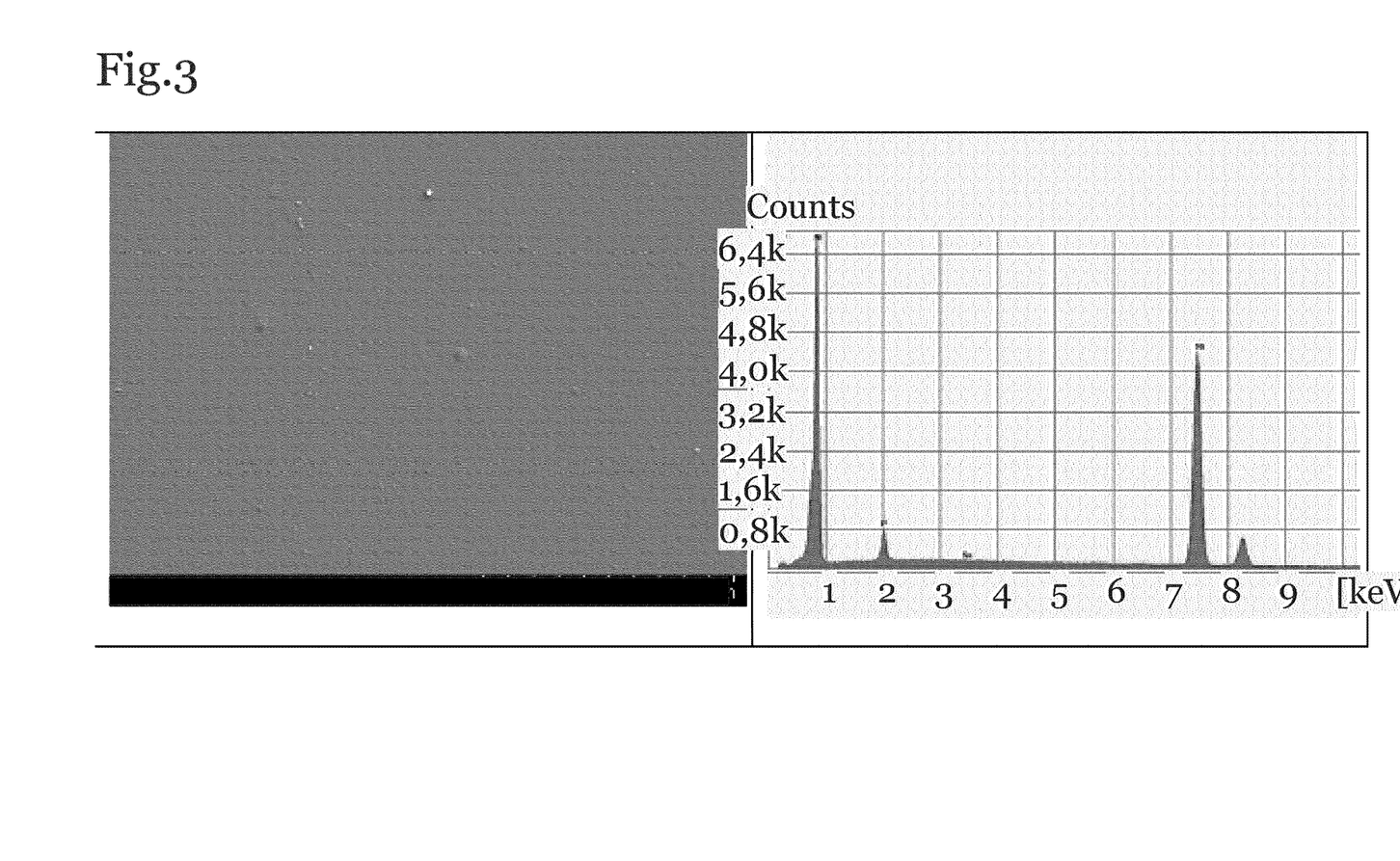

FIG. 3 shows the SEM micrograph of the surface.

EXAMPLE 2: LAYER COMPRISING NICKEL, MOLYBDENUM AND PHOSPHORUS

The following electrolyte composition was proposed:

510 g/l nickel sulphate hexahydrate 20 g/l nickel chloride hexahydrate 40 g/l boric acid 21 g/l phosphorous acid 50 g/l sodium citrate 13 g/l molybdatophosphoric acid The chemicals are dissolved in order in warm water. After adding and dissolving all the components, the pH is adjusted. The pH is adjusted using 1% sodium hydroxide solution or 50% sulphuric acid.

The pH should lie between 1.2-3.0, the optimum is 2.3.

The electrolyte operates at a temperature of 45-55° C.

Deposition takes place whilst stirring moderately vigorously (300-500 rpm).

A 1 mm thick brass plate having the dimensions 30 mm×30 mm was used as the substrate.

A unipolar rectangular pulse was used to produce the layer, wherein the mean current density was 3.0 A/dm$^2$. The cathodic current densities were 2.5 and 5.0 A/dm$^2$ for 10 ms, the subsequent pulse pause was 10 ms.

The coating time was one hour.

The layers thus produced had the following composition: nickel 96.2 wt. %, molybdenum 0.8 wt. % and phosphorus 3 wt. %, the alloy elements together gave 100%.

The layers showed good adhesion, were free from cracks and shiny, layer thicknesses were approximately 10 μm. Annealing at 200° C. was carried out for 30 minutes.

Figure 4:
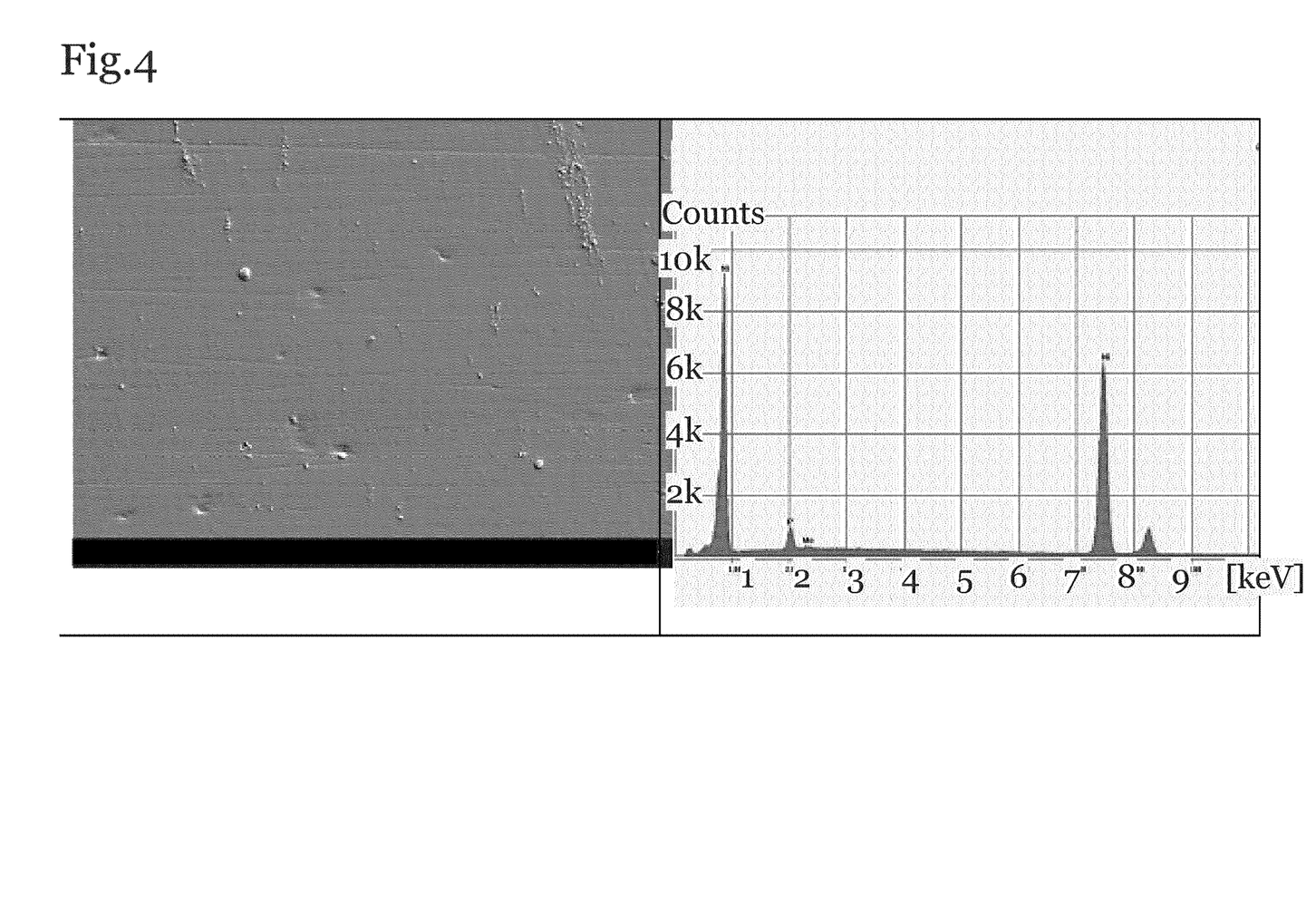

FIG. 4 shows the scanning electron micrograph of the surface of the layer and the EDX spectrum.

EXAMPLE 3: LAYER COMPRISING NICKEL, TIN, MOLYBDENUM AND PHOSPHORUS

The following electrolyte composition was proposed:

510 g/l nickel sulphate hexahydrate 20 g/l nickel chloride hexahydrate 40 g/l boric acid 21 g/l phosphorous acid 50 g/l sodium citrate 13 g/l molybdatophosphoric acid 12 g/l tin (VI) chloride hydrate The chemicals are dissolved in order in warm water. After adding and dissolving all the components, the pH is adjusted. The pH is adjusted using 1% sodium hydroxide solution or 50% sulphuric acid.

The pH should lie between 1.2-3.0, the optimum is 2.3.

The electrolyte operates at a temperature of 55-75° C.

Deposition takes place whilst stirring moderately to vigorously (300-500 rpm).

A 1 mm thick brass plate having the dimensions 30 mm×30 mm was used as the substrate.

A bipolar rectangular pulse was used to produce the layer, wherein the mean current density was 2.3 A/dm$^2$. The cathodic current densities were 2.0 and 6.0 A/dm$^2$ for 20 and 10 ms, the anodic current density was 5 A/dm$^2$ for 5 ms, the subsequent pulse pause was 10 ms.

The coating time was one hour.

The layers thus produced had the following composition: nickel 91.5 wt. %, molybdenum 2 wt. %, tin 0.5 wt. % and phosphorus 6 wt. %, the alloy elements together gave 100%.

The layers showed good adhesion, were free from cracks and shiny. The layer thickness was approximately 10 μm.

EXAMPLE 4: LAYER COMPRISING NICKEL, MOLYBDENUM AND PHOSPHORUS

The following electrolyte composition was proposed:

340 g/l nickel sulphate hexahydrate 20 g/l nickel chloride hexahydrate 13.7 g/l sodium hypophosphite 50 g/l sodium citrate 2.5 g/l sodium molybdate The chemicals are dissolved in order in warm water. After adding and dissolving all the components, the pH is adjusted. The pH is adjusted using 1% sodium hydroxide solution or 50% sulphuric acid. The pH should lie between 5.0-5.2, the optimum is 5.1.

The electrolyte operates at a temperature of 45-55° C.

Deposition takes place whilst stirring moderately vigorously (300-500 rpm).

A 1 mm thick brass plate having the dimensions 30 mm×30 mm was used as the substrate.

A unipolar rectangular pulse was used to produce the layer, wherein the mean current density was 1.6 A/dm$^2$. The cathodic current densities were 1.5 and 2.5 A/dm$^2$ for 10 ms, the subsequent pulse pause was 10 ms.

The coating time was one hour.

The layers thus produced had the following composition: nickel 90.5 wt. %, molybdenum 5.0 wt. % and phosphorus 4.5 wt. %, the alloy elements together gave 100%.

The layers showed good adhesion, were free from cracks and shiny.

Figure 5:
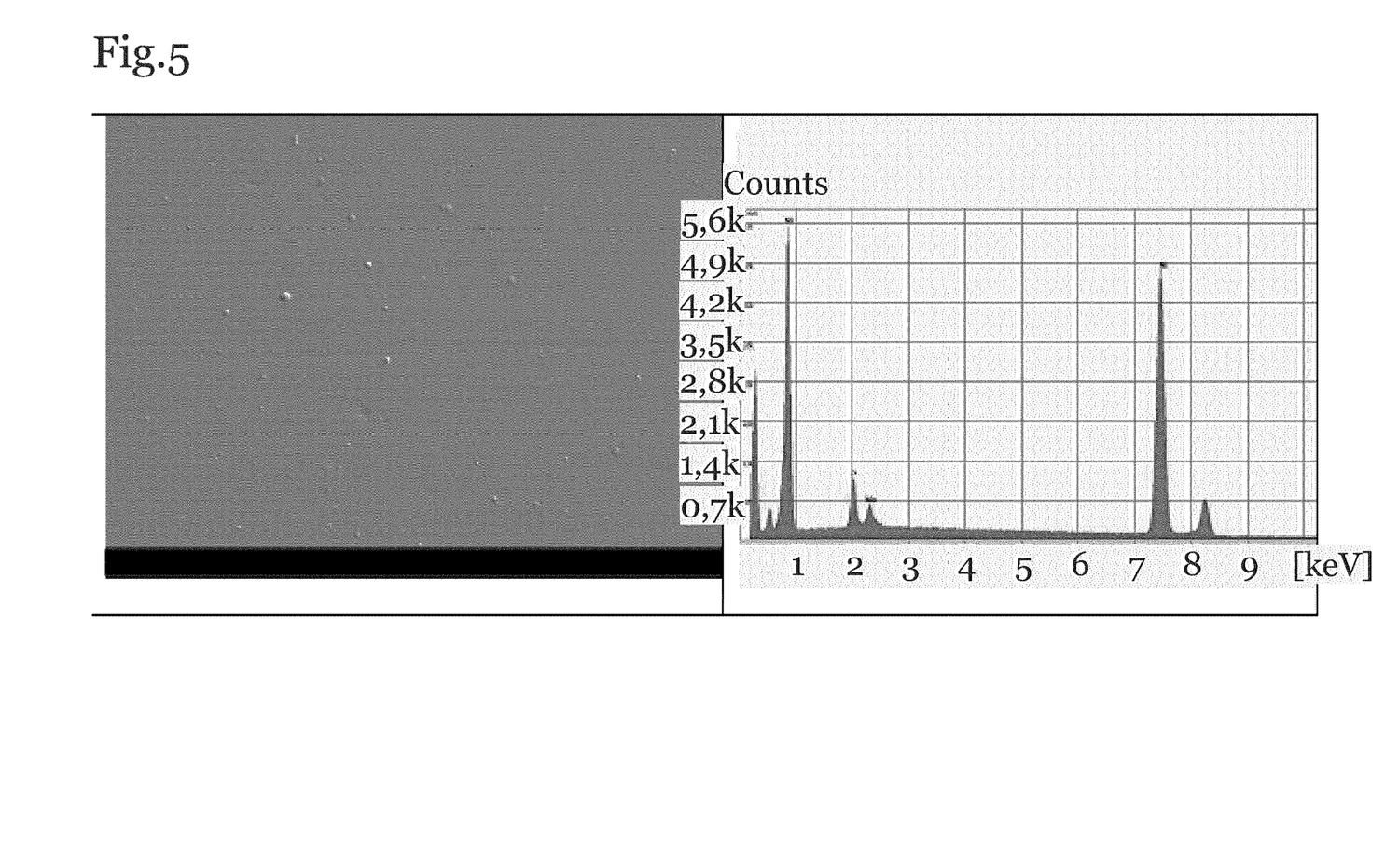

FIG. 5 shows the surface of the layer in a scanning electron micrograph and the EDX spectrum.

In particular the invention relates to a coating of metal surfaces of functional parts made of metal, preferably baking plates, wherein at least one coating with an alloy is applied galvanically to the metal surface. The functional parts can also be other metal parts which are used to heat food, such as frying pans, grill surfaces, cooking pots and the like. The baking plates are preferably baking plates for the industrial production of wafer products. All these functional parts are subsequently designated as baking plates.

Optionally it is provided that the coating comprises a surface layer which consists of a galvanically applied alloy which contains nickel, phosphorus, and tin as the main component and that the surface layer is an alloy layer obtained by a pulsed deposition, preferably an inverse pulsed deposition from a galvanic bath.

Only be using pulsed deposition, preferably an inverse pulsed deposition, can a coating be obtained on a metal surface which meets the high requirements, in particular in the food area. In particular, a coating is obtained which can be used in the food area, in particular in the baking industry, whilst adhering to the specification and conditions valid there. Optionally due to the properties of the pulsed method, it is also possible to influence or adjust the surface layer in terms of its properties.

Optionally it is provided that the surface layer contains phosphorus in the range of 1 to 15 wt. %, tin up to 10 wt. % and the remainder to 100 wt. % nickel.

Optionally it is provided that the alloy contains 0.05 to 10.0 wt. % tin and 1 to 15 wt. % phosphorus and nickel to 100 wt. %.

By adding tin and/or phosphorus, the release of nickel from the coating can be reduced, in particular substantially prevented. Only with the coating according to the invention is it possible to meet the high requirements, in particular the high requirements in the food area. Differently configured layers cannot prevent the release of coating components, in particular nickel, and therefore do not meet the high requirements. Optionally it is provided that the phosphorus content in the surface layer lies in the range from 7 to 14%, in particular 9 to 12%. Optionally the release of nickel cannot be sufficiently prevented below a phosphorus content of 9%.

Optionally it is provided that the surface layer additionally contains molybdenum and that the surface layer contains up to 10 wt. % of molybdenum and/or that the alloy contains 0.01 to 10 wt. % of molybdenum.

Since the surface layer also contains molybdenum, the wear resistance of the coating, in particular the hardness of the coating can be increased.

Optionally it is provided that the surface layer has a roughness, the Ra value of which is less than 5 μm, preferably less than 3 μm and particularly preferably less than 2 μm.

Optionally it is provided that the layer thickness of the surface layer is at least 5 μm preferably between 10 μm and 50 μm.

Optionally it is provided that one or more underlayers are disposed between surface layer and metal surface.

Optionally it is provided that the underlayers are nickel layers applied electrolytically or without external current.

Optionally it is provided that the hardness gradient of the underlayers as far as the surface layer is configured to be ascending.

Optionally it is provided that the underlayers are double-layer and a first underlayer nearest the metal surface consists of a semi-gloss nickel layer or copper and a second underlayer consists of a gloss nickel layer.

In particular, the invention relates to a baking plate having a coating according to the invention, wherein the coated metal surface is the baking surface of a baking plate, in particular a baking plate for the industrial manufacture of crispy brittle wafer sheets, waffles and hollow wafers as well as baked products of all kinds.

Optionally it is provided that the baking surface is formed with a moulding forming the baking mould and engraving.

Optionally it is provided that the coated baking plate is annealed at temperatures between 150° C. and 700° C., preferably between 200 and 400° C., particularly preferably at 300° C. and that the coated baking plate is annealed for a duration in the range from one hour to six hours, preferably up to four hours.

Optionally it is provided that the baking plate body of the baking plate consists of cast iron, steel, aluminium, aluminium alloys or copper and alloys thereof such as brass.

In particular, the invention relates to a method for the coating metal surfaces, in particular baking plates made of cast iron, steel, aluminium or aluminium alloys or copper and alloys thereof such as brass.

Optionally it is provided that the metal surface is coated at least in sections with a surface layer of NiSnP or NiSnMoP alloy in a galvanic method, preferably pulsed method and particularly preferably in an inverse pulsed method from a galvanic bath.

Optionally it is provided that the pulsed deposition of the coating from an electrolyte bath is carried out with the following parameter ranges:
a unipolar pulse sequence with
pulse current density 0.5-15 A/dm$^2$
cathodic pulse time 5-100 ms
off time 0.5-25 ms Optionally it is provided that a unipolar pulse sequence with base current and pulse pause as follows is used to produce the layer: pulse current density from 0.5 to 15 A/dm$^2$, base current density from 0.1 to 8 A/dm$^2$, cathodic pulse time from 5 to 100 ms, pulse pause from 0.5 to 30 ms, with a repetition rate of the cathodic sequence of 1 to 50 before the pulse pause.

Optionally it is provided that a bipolar pulse with pulse pause as follows is used to produce the layer: cathodic pulse current density from 0.5 to 12 A/dm$^2$ with a pulse time from 5 to 100 ms, anodic pulse current density from 0.5 to 20 A/dm$^2$ with a pulse time from 5 to 100 ms, pulse pause from 0.5 to 30 ms, with a repetition rate of the cathodic sequence of 1 to 50 before the pulse pause.

Optionally it is provided that a bipolar pulse with a base current as follows is used to produce the layer: cathodic pulse current density from 0.5 to 20 A/dm$^2$ with a pulse time from 5 to 100 ms, cathodic base current density from 0.5 to 12 A/dm$^2$ with a pulse time from 5 to 100 ms, anodic pulse current density from 0.5 to 20 A/dm$^2$ with a pulse time from 5 to 100 ms, with a repetition rate of the cathodic sequence of 1 to 50 before the anodic pulse current.

Optionally it is provided that the electrolyte bath contains salts and acids selected from the following group:
  a) nickel sulphate hexahydrate in the range of 250-700 g/l
  b) nickel chloride hexahydrate in the range of 5-50 g/l
  c) tin (IV) chloride hydrate in the range of 1-40 g/l
  d) tin (II) sulphate in the range of 1-30 g/l
  e) tin (II) chloride dihydrate in the range of 1-40 g/l
  f) sodium molybdate dihydrate in the range of 1-30 g/l
  g) molybdatophosphoric acid in the range of 1-30 g/l
  h) sodium citrate in the range of 1-90 g/l
  i) boric acid in the range of 25-45 g/l
  j) phosphorous acid in the range of 1-25 g/l
  k) phosphoric acid in the range of 1-5 g/l
  l) sodium hypophosphite in the range of 5-40 g/l
  m) sodium gluconate in the range of 40-90 g/l
  n) potassium sodium tartrate in the range of 10-50 g/l Optionally it is provided that the electrolyte bath contains the following constituents:
a) nickel sulphate hexahydrate in the range of 250-700 g/l
b) nickel chloride hexahydrate in the range of 5-50 g/l
c) tin (IV) chloride hydrate in the range of 1-40 g/l
i) boric acid in the range of 25-45 g/l
j) phosphorous acid in the range of 1-25 g/l
k) phosphoric acid in the range of 1-5 g/l Optionally it is provided that the electrolyte bath contains the following constituents:
a) nickel sulphate hexahydrate in the range of 250-700 g/l
b) nickel chloride hexahydrate in the range of 5-50 g/l
g) molybdatophosphoric acid in the range of 1-30 g/l
h) sodium citrate in the range of 1-90 g/l
i) boric acid in the range of 25-45 g/l
j) phosphorous acid in the range of 1-25 g/l
k) phosphoric acid in the range of 1-5 g/l Optionally it is provided that the electrolyte bath contains the following constituents:
a) nickel sulphate hexahydrate in the range of 250-700 g/l
b) nickel chloride hexahydrate in the range of 5-50 g/l
f) sodium molybdate dihydrate in the range of 1-30 g/l
h) sodium citrate in the range of 1-90 g/l
i) boric acid in the range of 25-45 g/l
l) sodium hypophosphite in the range of 5-40 g/l Optionally it is provided that the electrolyte bath additionally contains the following constituents:
g) molybdatophosphoric acid in the range of 1-30 g/l
h) sodium citrate in the range of 1-90 g/l Optionally it is provided that the electrolyte bath contains the following constituents:
a) nickel sulphate hexahydrate in the range of 250-700 g/l
b) nickel chloride hexahydrate in the range of 5-50 g/l
d) tin (II) sulphate in the range of 1-30 g/l
e) tin (II) chloride dihydrate in the range of 1-40 g/l
f) sodium molybdate dihydrate in the range of 1-30 g/l
i) boric acid in the range of 25-45 g/l
j) phosphorous acid in the range of 1-25 g/l
m) sodium gluconate in the range of 40-90 g/l
n) potassium sodium tartrate in the range of 10-50 g/l Optionally it is provided that the electrolyte bath contains the following constituents:
a) nickel sulphate hexahydrate in the range of 250-700 g/l
b) nickel chloride hexahydrate in the range of 5-50 g/l
d) tin (II) sulphate in the range of 1-30 g/l
e) tin (II) chloride dihydrate in the range of 1-40 g/l
f) sodium molybdate dihydrate in the range of 1-30 g/l
i) boric acid in the range of 25-45 g/l
j) phosphorous acid in the range of 1-25 g/l
m) sodium gluconate in the range of 40-90 g/l
n) potassium sodium tartrate in the range of 10-50 g/l Optionally it is provided that the pH of the electrolyte bath is 1.0 to 5.5 and the bath temperature of the electrolyte bath is 25° C. to 75° C.

Optionally it is provided that that the pH of the electrolyte bath is 1.0 to 1.5, in particular 1.1, 1.2 and 1.3. Optionally it is provided that the bath temperature is 55° C. to 65° C., in particular 60° C.

Optionally it is provided that the method comprises the following further steps:
washing the coated metal surface,
optionally drying the coated metal surface,
annealing the coated metal surface for a time in the range from one hour to six hours, in particular four hours, at a temperature in the range of 100° C. and 700° C., preferably between 200° C. and 400° C., particularly preferably 300° C.

Optionally it is provided that a coating having the hardness in the range of 400 Vickers and 800 Vickers, in particular 600 Vickers, is produced.

Optionally it is provided that the hardness of the coating is increased by annealing to 700 Vickers to 1000 Vickers, in particular 900 Vickers.

The hardness of the coating can be adjusted by annealing. Before the annealing step the coating possibly has a hardness of 400 to 800 Vickers, in particular 600 Vickers.

The hardness of the coating can be increased by annealing to 700 Vickers to 1000 Vickers, in particular 900 Vickers. The hardness of the coating can be adjusted by the annealing time and also the annealing temperature. In particular, a lower hardness of the coating can be achieved by a short annealing time and/or by a low annealing temperature. The annealing can be carried out in an annealing device, in particular an annealing furnace.

The term annealing should be understood in this context as a general heating of a material over a longer time interval. The annealing process can be carried out in air or also in an inert furnace atmosphere.

The invention claimed is:

1. A baking plate for the industrial manufacture of baked products, whereby a baking surface of the baking plate is formed with a moulding forming a baking mould and engraving and whereby the baking surface is a coated metal surface, wherein at least one coating comprising an alloy is applied galvanically to the metal surface from an electrolyte bath, wherein:
the coating comprises a surface layer which consists of a galvanically applied alloy which contains nickel, phosphorus and tin, wherein the alloy contains 0.05 to 10.0 wt. % tin and 1.0 to 15 wt. % phosphorus and the remainder up to 100 wt. % nickel,
wherein the pH-value of the electrolyte bath is 1.0 to 5.5 and the bath temperature of the electrolyte bath is 25° C. to 75° C.
wherein the surface layer is an alloy layer obtained by pulsed deposition,
wherein the surface layer has a roughness, the Ra value of which is less than 5 µm,
wherein the layer is produced by:
a unipolar pulse sequence as follows:
pulse current density from 0.5 to 15 A/dm$^2$;
cathodic pulse time from 5 to 100 ms; and
off time from 0 to 25 ms,
or the layer is produced by:
a bipolar pulse with a base current as follows:
cathodic pulse current density from 0.5 to 20 A/dm$^2$ with a pulse time from 5 to 100 ms;
cathodic base current density from 0.5 to 12 A/dm$^2$ with a pulse time from 5 to 100 ms;
anodic pulse current density from 0.5 to 20 A/dm$^2$ with a pulse time from 5 to 100 ms;
with a repetition rate of the cathodic sequence of 1 to 50 before the anodic pulse current.

2. The baking plate of claim 1, wherein the pulsed deposition is inverse pulsed deposition from a galvanic bath.

3. The baking plate of claim 1, wherein the Ra value is less than 3 µm.

4. The baking plate of claim 1, wherein the Ra value is less than 2 µm.

5. The baking plate according to claim 1, wherein the surface layer contains phosphorus in the range of 1 to 15 wt. %, and the remainder up to 100 wt. % nickel.

6. The baking plate according to claim 1, wherein the surface layer additionally contains molybdenum.

7. The baking plate of claim 1, wherein the surface layer contains molybdenum up to 10 wt. %.

8. The baking plate of claim 1, wherein the alloy contains 0.01 to 10 wt. % molybdenum.

9. The baking plate according to claim 1, wherein the layer thickness of the surface layer is at least 5 μm.

10. The baking plate according to claim 1, wherein the layer thickness of the surface layer is between 10 μm and 50 μm.

11. The baking plate according to claim 1, wherein one or more underlayers are disposed between the surface layer and the metal surface.

12. The baking plate according to claim 11, wherein the underlayers are nickel layers applied electrolytically or without external current.

13. The baking plate according to claim 11, wherein the hardness gradient runs in an ascending manner from the metal surface to the surface layer.

14. The baking plate according to claim 11, wherein the one or more underlayers comprise two underlayers that are double-layer and a first underlayer nearest the metal surface consists of a nickel layer or copper and a second underlayer consists of a nickel layer.

15. The baking plate according to claim 1, wherein the coated baking plate is annealed at a temperature between 150° C. and 700° C. and the coated baking plate is tempered for a duration in the range of one hour to six hours.

16. The baking plate according to claim 1, wherein a baking plate body of the baking plate consists of cast iron, steel, aluminum, aluminum alloys or copper and its alloys.

17. A method for making the baking plate according to claim 1, wherein a metal substrate is coated with the surface layer via a pulsed method from a galvanic electrolyte bath.

18. The method according to claim 17, characterized in that the electrolyte bath contains salts and acids selected from the following group:
 a) nickel sulphate hexahydrate in the range of 250-700 g/l
 b) nickel chloride hexahydrate in the range of 5-50 g/l
 c) tin (IV) chloride hydrate in the range of 1-40 g/l
 d) tin (II) sulphate in the range of 1-30 g/l
 e) tin (II) chloride dihydrate in the range of 1-40 g/l
 f) sodium molybdate dihydrate in the range of 1-30 g/l
 g) molybdatophosphoric acid in the range of 1-30 g/l
 h) sodium citrate in the range of 1-90 g/l
 i) boric acid in the range of 25-45 g/l
 j) phosphorous acid in the range of 1-25 g/l
 k) phosphoric acid in the range of 1-5 g/l
 l) sodium hypophosphite in the range of 5-40 g/l
 m) sodium gluconate in the range of 40-90 g/l
 n) potassium sodium tartrate in the range of 10-50 g/l.

19. The method according to claim 17, comprising the further following steps:
 washing the coated metal surface,
 optionally drying the coated metal surface,
 annealing the coated metal surface for a time in the range from one hour to six hours, at a temperature in the range of 100° C. and 700° C.

20. The method according to claim 17, characterized in that the coating has a hardness in the range of 400 Vickers and 800 Vickers.

21. The method according to claim 19, characterized in that the coating after annealing is 700 to 1000 Vickers.

* * * * *